United States Patent [19]

Duda

[11] Patent Number: 4,576,192
[45] Date of Patent: Mar. 18, 1986

[54] AWNING ASSEMBLY

[75] Inventor: Henry J. Duda, Elk Grove Village, Ill.

[73] Assignee: Randall Equipment Company, Chicago, Ill.

[21] Appl. No.: 460,178

[22] Filed: Jan. 24, 1983

[51] Int. Cl.$^4$ .............................................. E04F 10/00
[52] U.S. Cl. ....................................................... 135/89
[58] Field of Search ...................... 135/88, 90, 89, 903; 160/45, 22, 66, 67, 72, 76

[56]  References Cited
U.S. PATENT DOCUMENTS

| | | | |
|---|---|---|---|
| 2,788,791 | 4/1957 | Pospisil et al. | 135/903 |
| 2,889,840 | 6/1959 | McIlwaine | 135/89 X |
| 3,324,869 | 6/1967 | Duda | 135/5 |
| 3,826,271 | 7/1974 | Sattler et al. | 135/903 |
| 3,918,510 | 11/1975 | Hayward | 135/89 X |
| 4,117,876 | 10/1978 | Bennett | 135/89 X |
| 4,195,877 | 4/1980 | Duda | 135/89 X |

Primary Examiner—Robert A. Hafer
Assistant Examiner—Danton DeMille
Attorney, Agent, or Firm—Emrich & Dithmar

[57]  ABSTRACT

An awning assembly for a travel trailer or mobile home including a pair of spaced apart support arms each pivotally secured to the side of the trailer with a roller supported at the upper ends of the support arms carrying a flexible covering having one end secured to the roller. A flexible metal cover in the form of a number of strips is secured to the opposite end of the flexible covering and to the side of the trailer to cover the flexible covering when same is rolled around the roller to form a casing therefor. Latching mechanisms is carried by the flexible strip near each end thereof and cooperates with a pair of brace members each pivotally mounted at one end to a respective one of the support arms and has a latch on the other end thereof for latching connection to one of the latching mechanisms.

10 Claims, 5 Drawing Figures

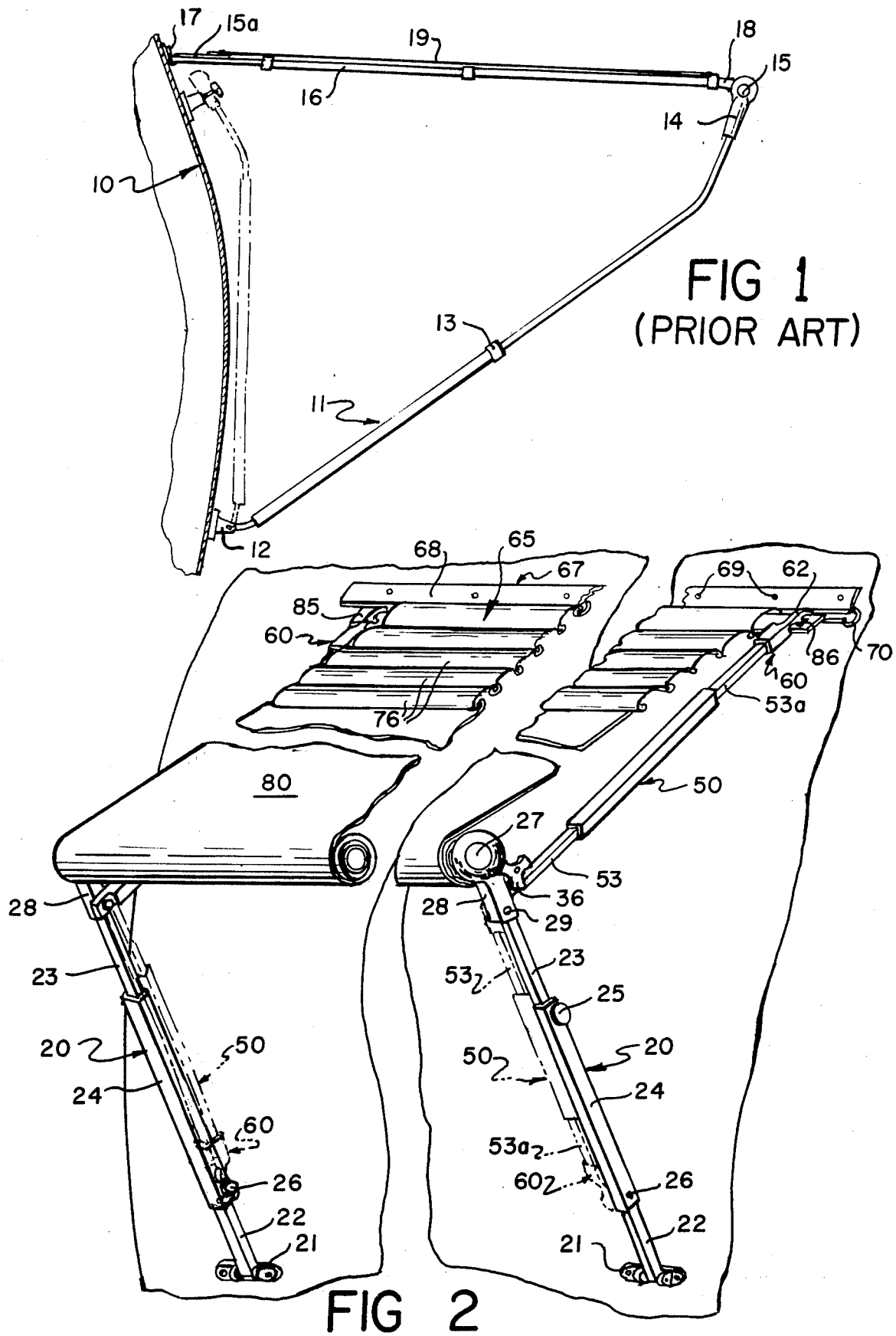

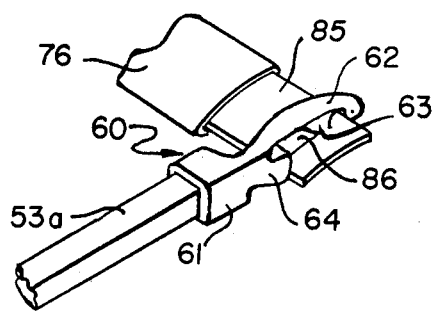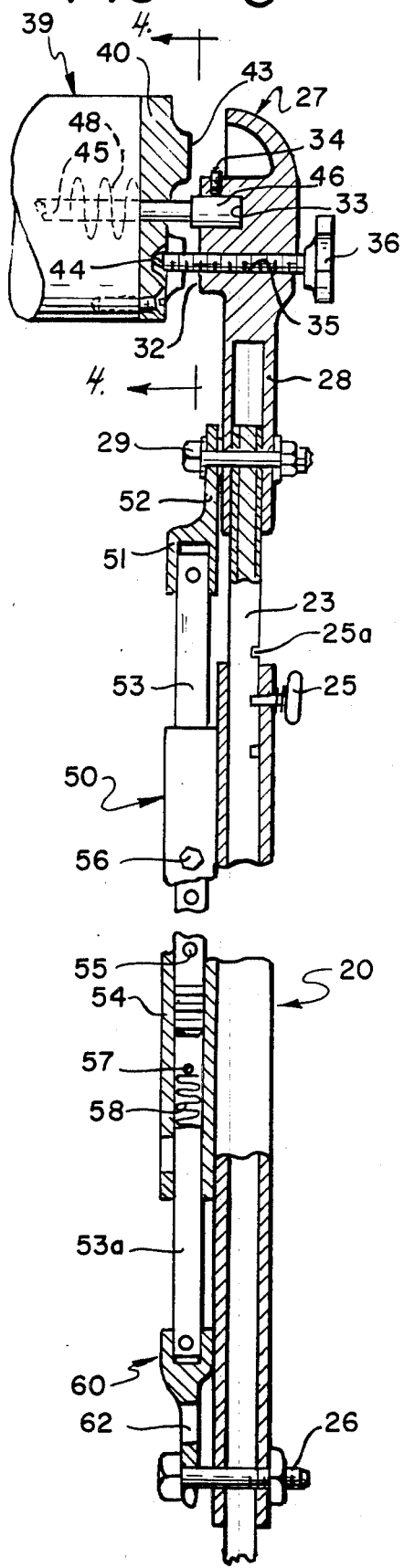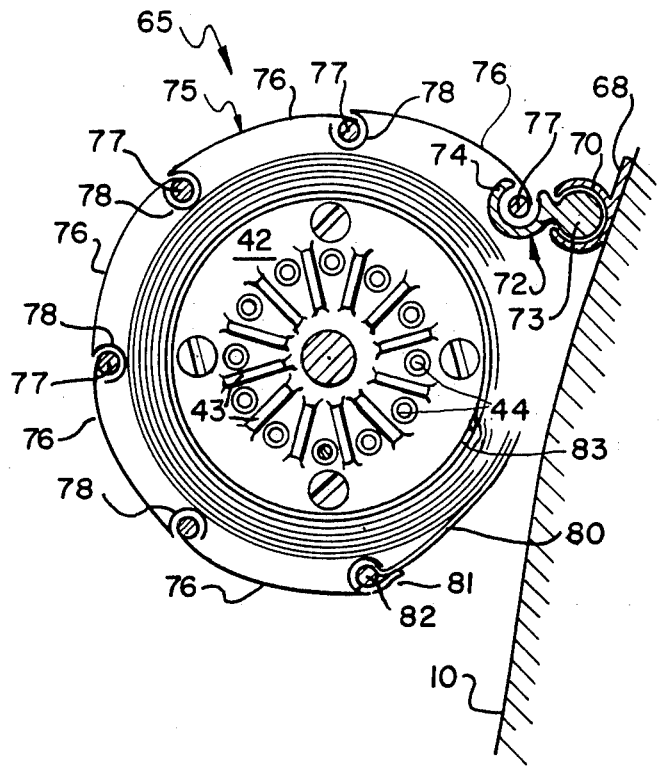

AWNING ASSEMBLY

BACKGROUND OF THE INVENTION

This invention relates to awnings for travel trailers and/or mobile homes and is of the same general type as disclosed in my previous U.S. Pat. No. 3,324,869 issued July 13, 1967 for Awnings For Travel Trailers And/Or Mobile Homes, the disclosure of which is incorporated herein by reference.

Although the awning there disclosed was entirely satisfactory for its intended purpose, there were certain shortcomings evidenced in the awning which have been corrected by the subject invention. Principally, it was found that the bracing members were cumbersome and difficult to use. In addition, the fact that the brace members connected to mechanism on the side of the trailer caused difficulties to owners in erecting the awning and adapting their trailers for use therewith. These difficulties have been overcome by the subject invention.

SUMMARY OF THE INVENTION

One of the objects of this invention is to provide a new and improved type of awning for a travel trailer or a mobile home wherein the awning may be permanently attached to the trailer so that it may be readily opened for use and readily closed or collapsed into a non-use or storage position, and wherein the trailer or mobile home may be moved or transported with the awning positively locked in such collapsed or storage position.

Another object of the invention is to provide an awning in which the awning covering when rolled up, as when in a collapsed or storage position, it encased within a protective metal enclosure and is fully protected against weather conditions, thus increasing the life of the awning covering.

Another object of this invention is to provide means to securely and positively lock the awning in either its extended or open position or in its closed, collapsed or storage position, thereby preventing any accidental opening or closing of same.

Yet another object of this invention is to provide an awning for a travel trailer or mobile home, the awning comprising a pair of spaced apart support arms each pivotally secured to the side of the trailer, a roller supported at the upper ends of the support arms, a flexible covering having one end thereof secured to the roller to be wound therearound, a flexible strip secured to the opposite end of the flexible covering and to the side of the trailer to cover the flexible covering when same is rolled around the roller to form a casing therefor, means on the roller to cause the roller to roll the flexible covering therearound, and a pair of brace members each pivotally mounted at one end to a respective one of the support arms and having mechanisms on the other end thereof for connection to the flexible strip.

Still a further object of the present invention is to provide an awning for a travel trailer or mobile home, the awning comprising a pair of spaced apart support arms each pivotally secured to the side of the trailer, a roller supported at the upper ends of the support arms, a flexible covering having one end thereof secured to the roller to be wound therearound, a flexible strip secured to the opposite end of the flexible covering and to the side of the trailer to cover the flexible covering when same is rolled around the roller to form a casing therefor, latching mechanisms carried by the flexible strip near each end thereof, means on the roller to cause the roller to roll the flexible covering therearound, and a pair of brace members each pivotally mounted at one end to a respective one of the support arms and having a latch on the other end thereof for latching connection to one of the latching mechanism.

A final object of the present invention is to provide an awning for a travel trailer or mobile home, the awning comprising a pair of spaced apart support arms each pivotally secured at one end thereof to the side of the trailer and having a cap at the other end thereof with an inwardly facing surface, a roller supported at the upper ends of the support arms, the roller having outwardly facing end surfaces, locking mechanism carried by the cap for cooperation with locking mechanism on the outwardly facing roller end surface, a flexible covering having one end thereof secured to the roller to be wound therearound, a flexible strip secured to the opposite end of the flexible covering and to the side of the trailer to cover the flexible covering when same is rolled around the roller to form a casing therefor, and means on the roller to cause the roller to roll the flexible covering therearound.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is an illustration of the prior art as evidenced by the aforementioned U.S. Pat. No. 3,324,869;

FIG. 2 is an enlarged perspective view of the one end of the awning of the present invention in its expanded or use position;

FIG. 3 is a view in section of one of the support and brace arm connected thereto and the end of a roller;

FIG. 4 is a view of the roller illustrated in FIG. 3 as seen along the line 4—4 thereof; and FIG. 5 is an enlarged perspective view showing the locking mechanism on the roller and the casing or flexible strip for the awning.

DESCRIPTION OF THE PREFERRED EMBODIMENT

Referring now to FIG. 1, there is disclosed a prior art trailer 10 having a support arm 11 which is pivotally mounted as at 12 to the trailer 10. The support arm 11 is adjustable as at 13 to provide movement between two telescoping sections thereof and has an upper end 14 which carries the roller 15. Also connected to the roller 15 is a brace 16 which is mounted as at 17 directly to the trailer and as at 18 is removably connected to the roller 15. An awning 19 stretches between the roller 15 and the mounting mechanism 15a at the trailer 10. As before discussed, the problem in the prior art structure is in the use of a separate brace 16 and the mounting mechanism 17 directly on the trailer 10. Additional problems lie in the particular lock mechanism disclosed in the aforementioned U.S. Pat. No. 3,324,869 which sometimes permitted the roller 15 to disengage from the lock mechanism causing inadvertent rolling up of the awning 19 or conversely unrolling of the awning 19 during transit. All of these problems have been obviated by the present invention.

Referring now to FIGS. 2-5, there is disclosed the awning assembly of the present invention which is mounted to a trailer 10. The awning assembly includes a pair of main arms 20 each comprised of a pair of telescoping inner members 22, 23 and an outer member 24, the inner member 22 being pivotally mounted to a clevis 21 connected to the trailer 10. The inner and outer telescoping members or tubes 22, 23, 24 have an adjusting or locking mechanism 25 in the form of a spring biased threaded member which serves to lock the inner and outer telescoping tubes 23,24 in a plurality of various positions indicated by the openings 25a in the inner tube 23, see FIG. 3. Stop mechanism 26 in the form of a threaded nut and bolt is positioned near the bottom of the each main support arm 20 to connect inner section 22 and outer section 24 and for a purpose hereinafter set forth.

At the top of each support arm 20 is a cap assembly 27 which is provided with a downwardly extending sleeve 28 shaped and dimensioned to snugly fit over the inner tubular member 23 of the support arm. Fastening means 29 serves to connect the cap assembly 27 with the support arm 20 and particularly the inner tubular member 23 thereof. The cap assembly 27 has an inwardly facing surface 32 and an enlarged cavity 33 opening onto the surface. A set screw 34 is positioned in the cap 37 so as to extend downwardly into the cavity 33, for a purpose hereinafter set forth. Finally, an internally threaded hole 35 extends through the cap 27 and threadedly engages a stop mechanism 36 in the form of a threaded bolt.

A roller 39 is rotatably mounted between the pair of end caps 27 on the ends of the support arms 20. The roller 39 has a pair of end plates 40 each having an outwardly facing surface 42 provided with alternating outwardly extending protuberances or ribs 43 and indentations or detents 44. A shaft 45 extends through the roller 39 in the same manner as described in my previous patent and has an end 46 snugly fitting within the cavity 43 and held against rotation by means of the set screw 34. A spring 48 is connected to the shaft 45 and to the roller 39 (not shown) in such a manner that the roller 39 serves to roll up the awning 80 to be described in the same fashion previously described in my prior patent.

Pivotally connected to each main arm 20 is a rafter brace member 50. Each rafter brace member 50 includes a mounting sleeve 51 having an extension portion 52 which is pivotally mounted to the adjacent main support arm 20 by the bolt or fastening means 29 which serves to connect the cap sleeve 28 with the inner tubular member 23 of the main support arm 20. Connected to the mounting sleeve 51 is an inner tubular arm 53 telescopically movable with respect to an outer tubular member 54. The bottom of the outer tubular member 54 is provided with an inner tubular telescopically extending member 53a which is provided at the inner end thereof with a spring 58 which is fixedly connected to a pin 57 mounted in the tubular member or outer arm 54, thereby to cause the inner member 53a to be spring biased toward the end 53 of the rafter brace 50. Finally, there are a plurality of longitudinally spaced apart bevelled detents 55 in the inner tubular member 53 which coact with a spring biased pin 56 extending through the outer tubular member 54 so as to permit longitudinal adjustment of the inner member 53 and the outer member 54 thereby to vary the effective length of the rafter braces 50.

A latch mechanism 60 is positioned on the distal end of the tubular member 53a for each of the rafter brace members 50. The latch mechanism 60 includes a sleeve portion 61, see FIG. 5, which is received on the free end of the member 53a and an outwardly extending hook portion 62 having a downwardly extending engagement portion 63. Extending underneath the hook portion 62 and curving upwardly toward the downwardly extending engagement portion 63 is an upwardly extending bearing portion 64, the portions 63,64 generally forming a C-shaped member for a purpose hereinafter set forth.

A cover assembly 65, see FIG. 4, includes a longitudinally extending mounting strip 67 having a flange 68 mounted to the trailer 10 by a series of longitudinally spaced apart fasteners such as rivets, bolts or the like. A mounting tube 70 extends downwardly from the lower edge of the strip 68 and is C-shaped in vertical cross section. The cover assembly 65 also includes a housing mounting mechanism 72 which has a longitudinally extending rod like portion 73 constructed and arranged to fit within the C-shaped tube 70 and which is swingable with respect thereto. Integral with the rod like portion 73 is a C-shaped open tube like portion 74 which also extends longitudinally of the trailer 10. The flexible cover or housing 75 is mounted within the housing mounting mechanism 72 and particularly the longitudinal C-shaped tube like portion 74 thereof.

The flexible housing 75 is comprised of a plurality of metal strips 76, preferably aluminum. Each of the metal strips 76 is slightly arcuate in transverse cross section and has a rod like member 77 forming one longitudinal edge thereof and a C-shaped receiving mechanism 78 at the other longitudinal edge thereof constructed and arranged to receive the rod like member 77 of the next adjacent strip 76 and to permit flexing or pivotal movement with respect thereto. The foregoing construction allows a metal cover to be formed, see FIG. 4, when the awning 80 is rolled up into its collapsed or storage position.

The awning 80 may be of any art recognized material and is provided with an end loop 81 through in which is a metal dowel 82 of the same rod-like configuration as the rod members 77 on the flexible strips 76. This rod like member or dowel 82 fits within the terminal C-shaped member 78 on the last of the metal strips 76. The other end 83 of the awning 80 is fixedly connected to the roller 39. Finally, extending outwardly from the ends of the metal strip 76 adjacent to the mounting flange 68 is a pair of latch receivers 85 each provided with a slot 86 therein of a shape and dimension to receive the downwardly extending engagement portion 63 of the latch mechanism 60. Because the flexible metal strips 76 are movable toward and away from the trailer 10, the bearing portion 64 of each latch mechanism is able to fit underneath the associated latch receiver plate 85 so as to firmly latch each of the rafter braces 50 to the associated latch receiver 85 and hence provide the rigid construction necessary for the awning of the present invention.

In operation, when the awning assembly is closed as illustrated in FIG. 4, the awning material 80 is fully wrapped around the roller 39 and the cover assembly 65 is such that the flexible housing 75 is wrapped around most of the exposed portion of the awning 80 thereby to protect same during transit. In the collapsed or storage position thereof, the stop mechanism 36 is firmly screwed into each of the end plates 40 thereby to be positioned within one of the detents 44 and between adjacent ribs 43, thereby preventing any inadvertent movement of the roller 39 with respect to the trailer 10.

When it is desired to expand the awning assembly into the configuration shown in FIG. 2, the stops 36 are released on each side of the roller 39 and the roller along with the main support arms 20 are moved to the fully extended position shown in FIG. 2. At this time adjustments can be made with respect to the effective length of the main support arms 20 by means of the spring biased pins 25 cooperating with the plurality of apertures 25a in each of the inner tubular members 23. After the effective length of the main support arms 20 is adjusted into the desired and correct lengths, then the rafter brace members 50 may be fixed in place. To accomplish this, the rafter braces 50 are removed from the stop mechanism 26 on the main support arms 20 and pivoted around to the use position illustrated in FIG. 2. The effective length of each of the rafter braces 50 is changed by means of the spring biased detent pin 56 which cooperates with bevelled detents 55 to provide for longitudinal adjustment of the inner member 53 and outer member 54 to enable the effective length of the rafter braces 50 to be varied. Finally, the spring biased extension 53a on which is mounted the latch mechanism 60 maintains the rafter brace 50 under tension thereby to ensure a strong and stable configuration. The latch mechanism 60 and particularly the downwardly extending engagement portion 63 and the bearing portion 64 serve to mount the latching mechanism 60 to the latch receiver 85 which extend outwardly beyond the ends of the first metal strip 76 of the flexible housing 75.

Disassembly is accomplished by releasing the latch mechanism 60 from the latch receiver 85 and thereafter adjusting the length of each of the rafter braces 50 so that the latch mechanism 60 again is seated on and securely connected to the stop mechanism 26, it being obvious that if the effective length of the rafter brace 50 is short enough, the tension mechanism 58 will maintain the latch mechanism 60 in tension thereby to prevent inadvertent disconnection of the rafter brace 50 from the stop mechanism 26. Thereafter, the stop mechanisms 36 are released thereby allowing the roller 29 working under the influence of the spring 48 to roll upwardly to the position illustrated in FIG. 4 wherein the awning 80 is wrapped around the roller 39 and the cover assembly 65 is in the position shown. When the flexible housing 75 is in the position illustrated in FIG. 4, each of the metal strips 76 serves to protect the awning 80 thereby to ensure longer life. The main support arms 20 each having its effective length adjusted by means of the spring bias pin 25 in cooperation with the stop mechanisms 36 which are again screwed down into the end plates 40 on the roller 39 to maintain the awning assembly in its collapsed or storage condition. The use of alternating ribs 43 and detents 44 in each of the end plates 40 in cooperation with the screwed on stop mechanism 36 serve to maintain the awning assembly in its collapsed or storage condition even during travel over rough roads and the like. This is a significant improvement in the art.

While there has been described what at present is considered to be the preferred embodiment of the present invention, it will be understood that various modifications and alterations may be made therein without departing from the true scope of the invention which is intended to be covered by the claims appended hereto.

What is claimed is:

1. An awning for a vehicle, said awning comprising: a pair of spaced apart support arms each having one end thereof pivotally secured to the vehicle, two caps respectively carried by said support arms at the other ends thereof, a roller rotatably supported between said caps, at least one end of said roller having a plurality of alternating detents and ribs formed therein facing the adjacent one of said caps, said cap facing said one end of said roller having a threaded aperture therethrough, a screw threadedly engaged in said aperture and extending therethrough for engagement with said ribs to prevent rotation of said roller with respect to said cap regardless of the positions of said support arms, a flexible covering having one end thereof secured to said roller to be wound therearound, a flexible strip secured to the opposite end of said flexible covering to form a casing therefor when said flexible covering is completely rolled around said roller, latch receivers carried by said flexible strip respectively adjacent to the opposite ends thereof, means on said roller to cause said roller to roll said flexible covering therearound, a pair of brace arms each having one end thereof pivotally mounted on a corresponding one of said support arms, and latches respectively carried by said brace arms at the other ends thereof for latching engagement with said receivers when said flexible covering is unrolled for maintaining it in an unrolled condition.

2. The awning of claim 1, wherein said flexible strip comprises a series of interconnected metal plates.

3. The awning of claim 2, wherein each plate in said flexible strip has one rod like longitudinal edge and one C-shaped longitudinal edge shaped and dimensioned to receive therein the rod like longitudinal edge of an adjacent plate and to trap same while permitting relative movement between adjacent interconnected plates.

4. The awning of claim 1 and further comprising stop mechanism on each of said support arms for retaining the associated brace arm in a storage position when the flexible covering is rolled around said roller and said flexible strip forms a casing therefor.

5. The awning of claim 1, wherein said brace arms each comprise a plurality of sections relative to each other.

6. The awning of claim 5, and further comprising locking means on said brace arms for locking at least two of said sections relative to each other in a plurality of adjusted positions.

7. The awning of claim 1, wherein each of said brace arms is in three sections, one of said sections having said latch at the end thereof and being connected to the adjacent section of said brace arm by means of a spring biased mechanism to maintain said latch under tension when said latch is connected to said flexible strip latch receiver.

8. The awning of claim 1, wherein said latch receivers carried by said flexible strip near each end thereof comprise a pair of slotted plates.

9. The awning of claim 8, wherein said brace arm latches each have a finger portion extending outwardly from said brace arm of a dimension to fit within said slot in said latch receiver.

10. The awning of claim 9, wherein each of said latches on said brace arms has a hooking portion constructed in shape to fit underneath the associated latch receiver when said brace arms are latchingly connected to the latch receiver, said finger portion and said hooking portion being generally C-shaped.

* * * * *